United States Patent [19]

Mills

[11] Patent Number: 4,782,597

[45] Date of Patent: Nov. 8, 1988

[54] ATTACHABLE LEVEL INDICATOR

[76] Inventor: Norman J. Mills, 820 Aspen Rd., West Palm Beach, Fla. 33409

[21] Appl. No.: 152,242

[22] Filed: Feb. 4, 1988

[51] Int. Cl.$^4$ ............................................. G01C 9/26
[52] U.S. Cl. ..................................................... 33/370
[58] Field of Search .............. 33/347, 370, 371, 379, 33/194, 646–649; 411/439, 474, 475, 482, 446–448

[56] References Cited

U.S. PATENT DOCUMENTS

| 378,548 | 2/1888 | Hotchkiss | 33/646 |
| 1,153,760 | 9/1915 | Butler | 33/370 |
| 2,570,430 | 10/1951 | Cramer | 33/370 X |
| 3,191,864 | 6/1965 | Moses | 411/446 X |

Primary Examiner—Harry N. Haroian
Attorney, Agent, or Firm—Victor F. Volk

[57] ABSTRACT

A level-indicating device comprises nail-guiding means for tacking the level onto a door or other wooden structure.

4 Claims, 1 Drawing Sheet

U.S. Patent  Nov. 8, 1988  4,782,597
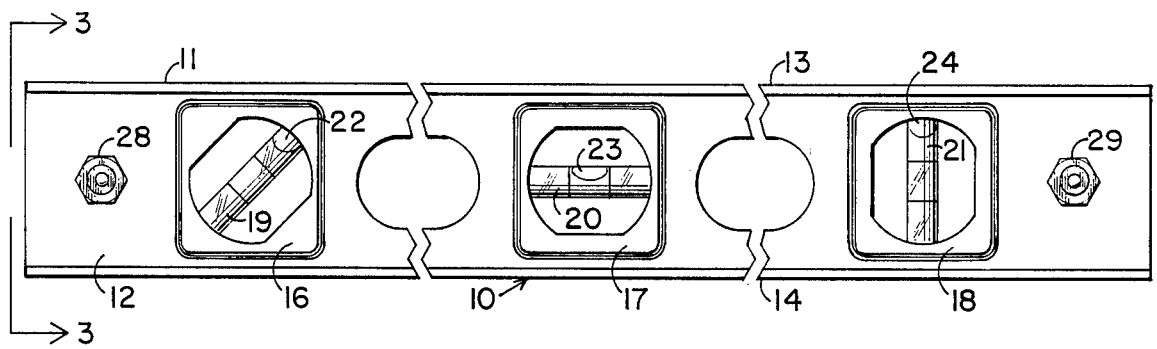
FIG. 1
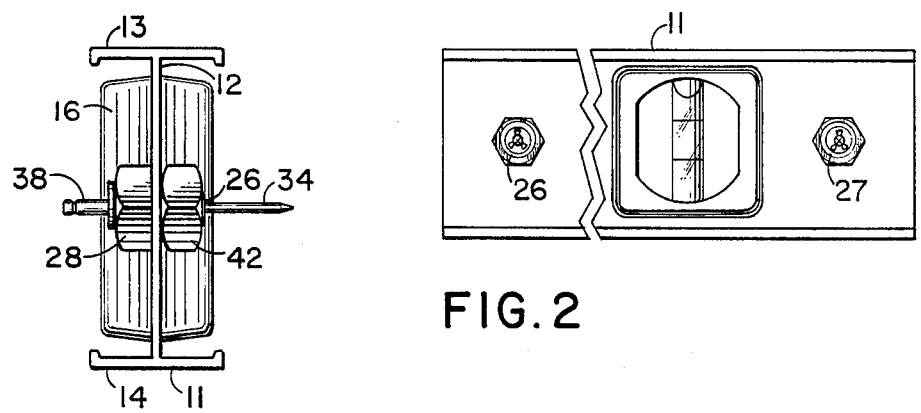
FIG. 3
FIG. 2
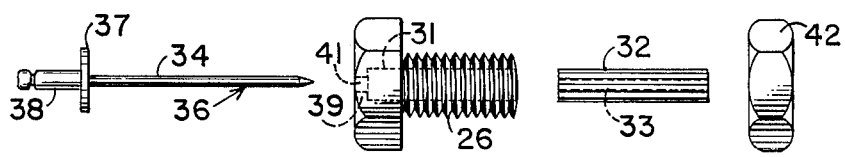
FIG. 4

ATTACHABLE LEVEL INDICATOR

BACKGROUND OF THE INVENTION

My application Ser. No. 039,702, now U.S. Pat. No. 4,739,561, described a level indicator for use in the installation of prehung doors. However, each one of these indicators, while it solved the problem of freeing a carpenter's hands for other jobs than holding the level, was limited in its application to a door of a given thickness, and there remains a need for a level indicator that can be readily and removably atttached, not only to doors of varied thickness, but to other wooden structures in a manner that will free a caprenter's hands to work on them. My above-mentioned patent and the prior art patents cited therein are incorporated herein by reference but none of them bear any suggestion of the novel and useful structure to be described.

SUMMARY

I have invented a bubble tube supporting means that comprises nail guiding means and a pointed nailing means that is slidably gripped within. Preferably the nail guiding means comprises a threaded tube, such as a hollowed out bolt that passes through a plate-like portion of the supporting means. Synthetic polymeric material in the bolt serves to grip the nailing means and a small opening in the nut end of the bolt permits the nailing means to pass through. Advantageously the supporting means takes the form of an I-beam and two of my nail guiding bolts, spaced apart, pass through the web of the I-beam where they are locked in place by threaded nuts.

BRIEF DESCRIPTION OF THE DRAWING

FIG. 1 is a front view of my device.
FIG. 2 is a partial back view of the device of FIG. 1.
FIG. 3 is an end view of the device of FIG. 1.
FIG. 4 is an exploded view of the nail guiding means of FIG. 1.

DETAILED DESCRIPTION OF REFERRED EMBODIMENT

Referring first to FIG. 1 my device 10 comprises an aluminum I-beam 11 comprising a web 12 and two flanges 13, 14. The web 12 has been partially removed to house three conventional bubble tube assemblies 16, 17, 18 mounting the respective bubble tubes 19, 20, 21 comprising the respective gas bubbles 22, 23, 24. The web 12 also defines two openings of the passage of two threaded bolts 26, 27 with respective hexagonal boltheads 28, 29.

As exemplified in FIG. 4 the bolts 26, 27 have been hollowed out at 31 to form a recess for a plastic plug 32 with a lengthwise bore 33 that tightly fits the shank 34 of a pointed nailing means 36 with a cap 37 and an extension 38 which can be gripped by pliers or the like to withdraw the nailing means conveniently as desired. The bolt head 28 and its counterpart 29 are not drilled completely through but are closed by membranes such as a membrane 39 with a central opening 41 for the shank 34. The bore 33 is not necessarily circular in section but it grips the nailing means sufficiently to retain it indefinitely in the plug while, at the same time, offering little effective resistance to its being tapped forward or deliberately withdrawn by pliers. A nut 42, fitting the bolt 26 will lock the bolt to the web 12 (FIG. 3) after it has been inserted through a hole formed in the web for that purpose.

In the application of my device to a door or other construction member one of the flanges 13, 14 will be held flush to an edge. with the points of the shanks 34 facing the surface of the door while the nailing means 36 are tapped in far enough to hold steadily. The carpenter's hands are then free to work on the construction. Applications will include both inside and outside work on domestic and commercial housing. Members being levelled vertically, diagonally or vertically will be benefitted by the use of my device which is also useful for constructing form work for driveways, patios, sidewalks, etc. It is particularly useful for hanging panelling and can be readily attached to a straight edged 2x4 for plumbing partitions.

The foregoing description has been exemplary rather than definitive of my invention for which I desire an award of Letters Patent as defined in the appended claims.

I claim:
1. A level-indicating-device comprising:
   (A) supporting means for a bubble tube, said supporting means comprising a plate-like portion,
   (B) a bubble tube fixedly supported by said supporting means,
   (C) nail guiding means fixedly attached to said supporting means, said nail-guiding means comprising a rigid tube comprising a threaded outer surface passing through said plate-like portion, synthetic polymeric nail-gripping material confined in said tube and nut means locking said tube to said plate-like portion, and
   (D) pointed nailing means slidingly gripped in said nail guiding menas whereby said device may be removably attached to a wooden structure being leveled.
2. The device of claim 1 wherein said plate-like portion comprises the web of an I-beam.
3. The device of claim 2 comprising two of said nail-guiding means widely spaced along the length of said I-beam.
4. The device of claim 1 wherein said rigid tube comprises nut means substantially closing one end thereof and an opening through said nut means sufficient for the passage of said nailing means.

* * * * *